US008238445B2

(12) United States Patent
Wang et al.

(10) Patent No.: US 8,238,445 B2
(45) Date of Patent: Aug. 7, 2012

(54) VIDEO AND AUDIO SYNCHRONIZATION METHOD AND RELATED APPARATUS FOR A MULTIMEDIA INTERFACE

(75) Inventors: Te-Ju Wang, Tao-Yuan Hsien (TW); Chih-Feng Juan, Taipei (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 1533 days.

(21) Appl. No.: 11/685,778

(22) Filed: Mar. 14, 2007

(65) Prior Publication Data

US 2008/0129871 A1 Jun. 5, 2008

(30) Foreign Application Priority Data

Nov. 30, 2006 (TW) ................................ 95144495 A

(51) Int. Cl.
| | |
|---|---|
| *H04N 7/12* | (2006.01) |
| *H04N 7/14* | (2006.01) |
| *H04N 7/16* | (2011.01) |
| *G01R 35/00* | (2006.01) |
| *H04N 9/475* | (2006.01) |
| *H04N 5/44* | (2011.01) |
| *H04N 5/14* | (2006.01) |
| *G06F 1/32* | (2006.01) |

(52) U.S. Cl. ........... 375/240.28; 375/240.12; 348/14.02; 725/151; 702/89

(58) Field of Classification Search ............. 375/240.28, 375/240.25, 240.12; 348/14.02; 725/151; 702/89

See application file for complete search history.

(56) References Cited

U.S. PATENT DOCUMENTS

| | | | |
|---|---|---|---|
| 7,088,398 B1 * | 8/2006 | Wolf et al. | ............... 375/240.28 |
| 2003/0197534 A1 | 10/2003 | Feng | |
| 2006/0012710 A1 | 1/2006 | Sasaki | |
| 2007/0011720 A1 * | 1/2007 | Min | ............................. 725/151 |
| 2008/0109180 A1 * | 5/2008 | Keady et al. | .................... 702/89 |

FOREIGN PATENT DOCUMENTS

| | | |
|---|---|---|
| TW | 200611580 | 4/2006 |
| TW | 200639713 | 11/2006 |
| WO | WO 03058946 A2 * | 7/2003 |

OTHER PUBLICATIONS

Azzedine Boukerche, Harold Owens, II; "Media synchronization and QoS packet scheduling algorithms for wireless systems"; Feb. 2005; Mobile Networks and Applications, vol. 10 Issue 1-2; Publisher: Kluwer Academic Publishers; pp. 233-249.*

\* cited by examiner

*Primary Examiner* — Eleni Shiferaw
*Assistant Examiner* — Courtney Fields
(74) *Attorney, Agent, or Firm* — Winston Hsu; Scott Margo

(57) ABSTRACT

A video and audio data synchronization method for a high-definition multimedia interface (HDMI) having a plurality of channels for outputting video and audio data includes determining a boundary between a control period and a data/video period in each of the plurality of channels, adjusting timing sequences of the plurality of channels respectively according to the boundaries, and simultaneously outputting video and audio data of the plurality of channels according to the timing sequences of the plurality of channels. This method can prevent loss of synchronization between channels due to layout and process variation.

15 Claims, 5 Drawing Sheets

VIDEO AND AUDIO SYNCHRONIZATION METHOD AND RELATED APPARATUS FOR A MULTIMEDIA INTERFACE

BACKGROUND OF THE INVENTION

1. Field of the Invention

The present invention relates to a video and audio synchronization method and related apparatus for a multimedia interface, and more particularly, to a video and audio synchronization method and related apparatus utilizing a boundary between a control period and a data/video period of HDMI serial video and audio data for calibrating and synchronizing timing sequences of data transmission in a plurality of data channels.

2. Description of the Prior Art

With the popularity of digital televisions, DVD display devices, and high definition flat panel displays, the time when people can really enjoy videos with high definition and high quality has finally arrived. However, the mainstream of signal transmission interfaces for flat panel displays is still based on conventional analog interfaces that have limitations of transmission distance and signal bandwidth. Furthermore, the flat panel displays have to convert the analog signals into digital signals through built-in analog-to-digital converters. In this case, not only does there exist a great energy loss in the signal conversion, but the transmission distance is also less than 2 to 3 meters. Therefore, in order to solve the problem, seven companies, including Intel et al., provided a specialized signal transmission interface for digital display devices: Digital Visual Interface (DVI). DVI is utilized for transmitting video signals in digital format to display devices. Since operations such as coding, compression, and error correction can be performed on digital signals, the transmission distance can be extended to 10-20 meters, and high quality images can also be obtained. However, the size of DVI connector is large, and audio signals cannot be transmitted through DVI, so DVI is mainly used for image data transmission between computers and display devices.

Based on DVI, a high definition multimedia interface (HDMI) is a transmission interface specifically designed for next generation multimedia video and audio devices. HDMI is suitable for digital televisions, DVD recorders and players, set-top boxes, and other multimedia electronic devices. Different from transmitting the audio and video signals separately, the most significant characteristic of HDMI is that the video and audio signals are integrated and transmitted together through HDMI. In HDMI, uncompressed digital data transmission is utilized for eliminating signal interference and attenuation effectively in conversion of digital and analog signals. Compared with DVI, not only is the size of HDMI connector smaller, but the audio signals and the control signals for the devices can also be transmitted with the video signals. Furthermore, a high bandwidth digital content protection (HDCP) technique can be added in HDMI for preventing image data from being copied illegally.

Please refer to FIG. 1. FIG. 1 is a schematic diagram of an HDMI transmission and reception system 100. The HDMI interface utilizes a transition minimized differential signaling (TMDS) method for coding, and includes four data transmission channels, three of which (TMDS channel 0 through TMDS channel 2) are utilized for transmitting video and audio data, and the other of which is utilized for transmitting clock data. A display data channel (DDC) is utilized for reading an extended display identification data (EDID) indicating the display characteristics of the receiving end, such as resolution, etc. First, the transceiver 110 converts and synthesizes the video and audio data into a format capable of being received by the receiver 120. The transceiver 110 then encodes the video and audio data by TMDS, converts the video and audio data from parallel format to serial format, and transmits the serial data by low voltage differential signaling (LVDS). Note that, the operation of the receiver 120 is the same as that of the transceiver 110, but the operation sequence is opposite.

Generally speaking, the transceiver 110 outputs respectively the ordered serial video and audio data into the TMDS channels at the same time. However, due to layout or process variation, the length, impedance, gain, and attenuation of each TMDS channel are different, such that the data transmission in each TMDS channel is delayed by a different amount. That is, the timing sequence is shifted by different amounts. In this case, the receiver 120 cannot receive the video and audio data transmitted in the TMDS channels simultaneously. Therefore, in order to enable the receiver 120 to acquire all of the desired video and audio data correctly, it is very important to calibrate and synchronize the timing sequence of the data transmission channels. However, the method and the related apparatus for calibrating the timing sequence of the data transmission channels is not set forth in the HDMI specification and in the prior art.

SUMMARY OF THE INVENTION

It is therefore a primary objective of the present invention to provide a video and audio synchronization method and related apparatus for a multimedia interface.

The present invention discloses a video and audio data synchronization method for a multimedia interface having a plurality of channels for outputting video and audio data comprising: determining a boundary between a first data period and a second data period in each of the plurality of channels; adjusting timing sequences of the plurality of channels respectively according to the boundary between the first data period and the second data period in each of the plurality of channels; and outputting the video and audio data of the plurality of channels simultaneously according to the timing sequences of the plurality of channels.

The present invention further discloses a video and audio data synchronization apparatus for a multimedia interface having a plurality of channels for outputting video and audio data comprising: a decision unit for determining a boundary between a first data period and a second data period in each of the plurality of channels; a timing sequence adjustment unit coupled to the decision unit for adjusting timing sequences of the plurality of channels respectively according to the boundary between the first data period and the second data period in each of the plurality of channels; and an output unit coupled to the timing sequence adjustment unit for outputting the video and audio data of the plurality of channels simultaneously according to the timing sequences of the plurality of channels.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
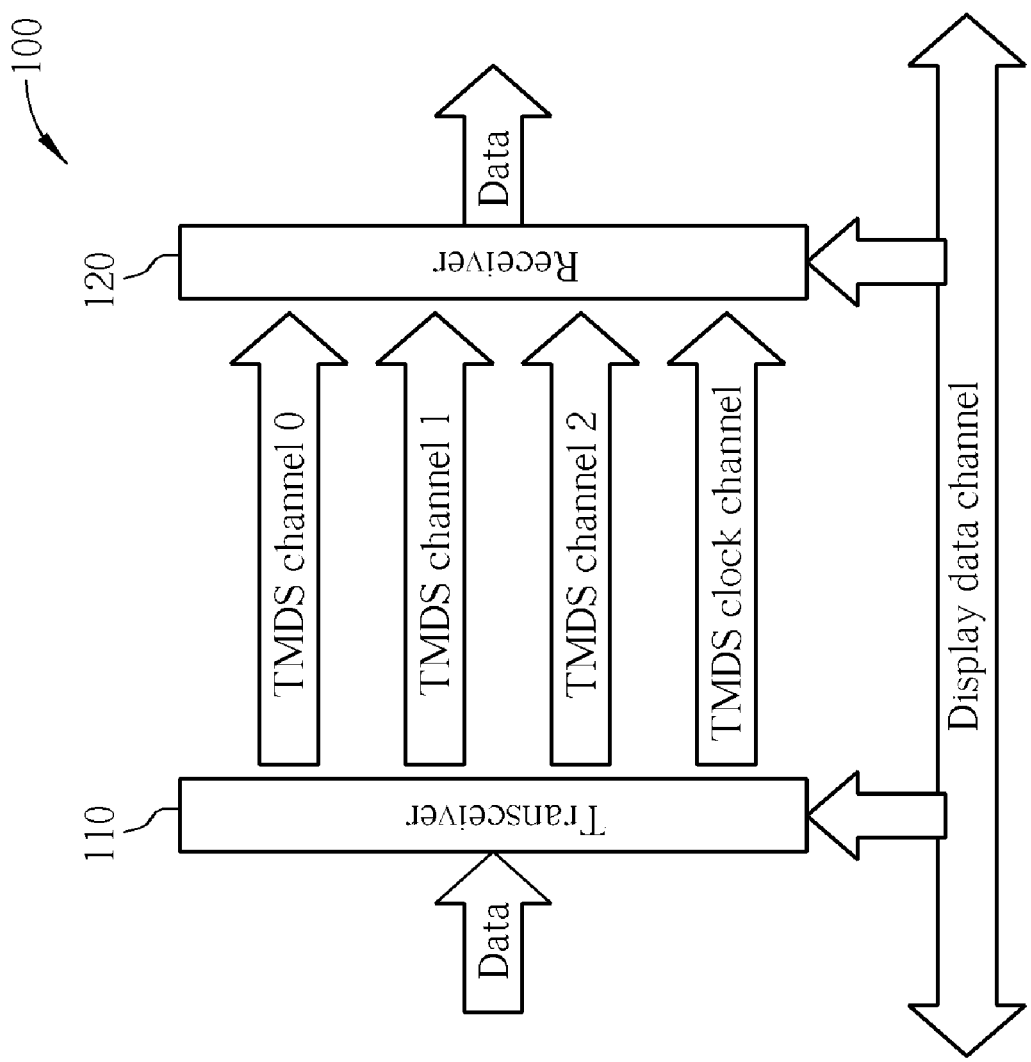
FIG. 1 is a schematic diagram of an HDMI transmission and reception system.
Figure 2:
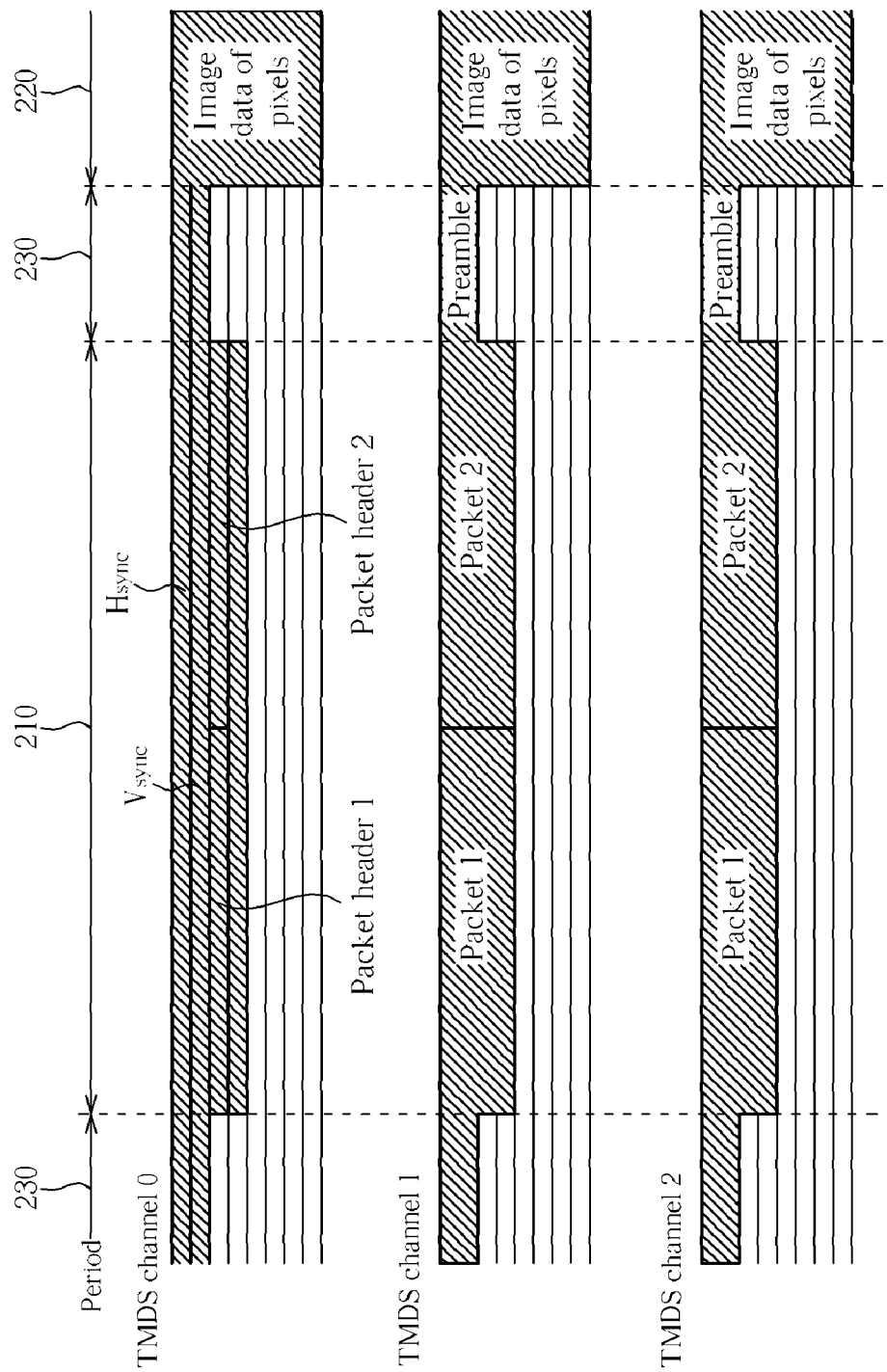
FIG. 2 is a schematic diagram of data formats transmitted by TMDS channels.

For clearly illustrating the present invention, data formats transmitted by transition minimized differential signaling (TMDS) channels are stated in the following. Please refer to FIG. 2. FIG. 2 is a schematic diagram of the data formats transmitted by the TMDS channels. As shown in FIG. 2, the data transmitted in the TMDS channels can be divided into three data periods: a packet data period 210, a video data period 220, and a control period 230. The packet data period 210 is utilized for transmitting audio and auxiliary signals of the video and audio data in a packet format. The video data period 220 is utilized for transmitting image data of pixels of the video and audio data. The control period 230 is utilized for transmitting preambles of the video and audio data, which indicate to a decoder whether the upcoming data period is a packet data period 210 or a video data period 220. Therefore, the control period 230 always precedes the packet data period 210 and the video data period 220. In other words, there must be a control period 230 between any two data periods including video and audio data.

Figure 3:
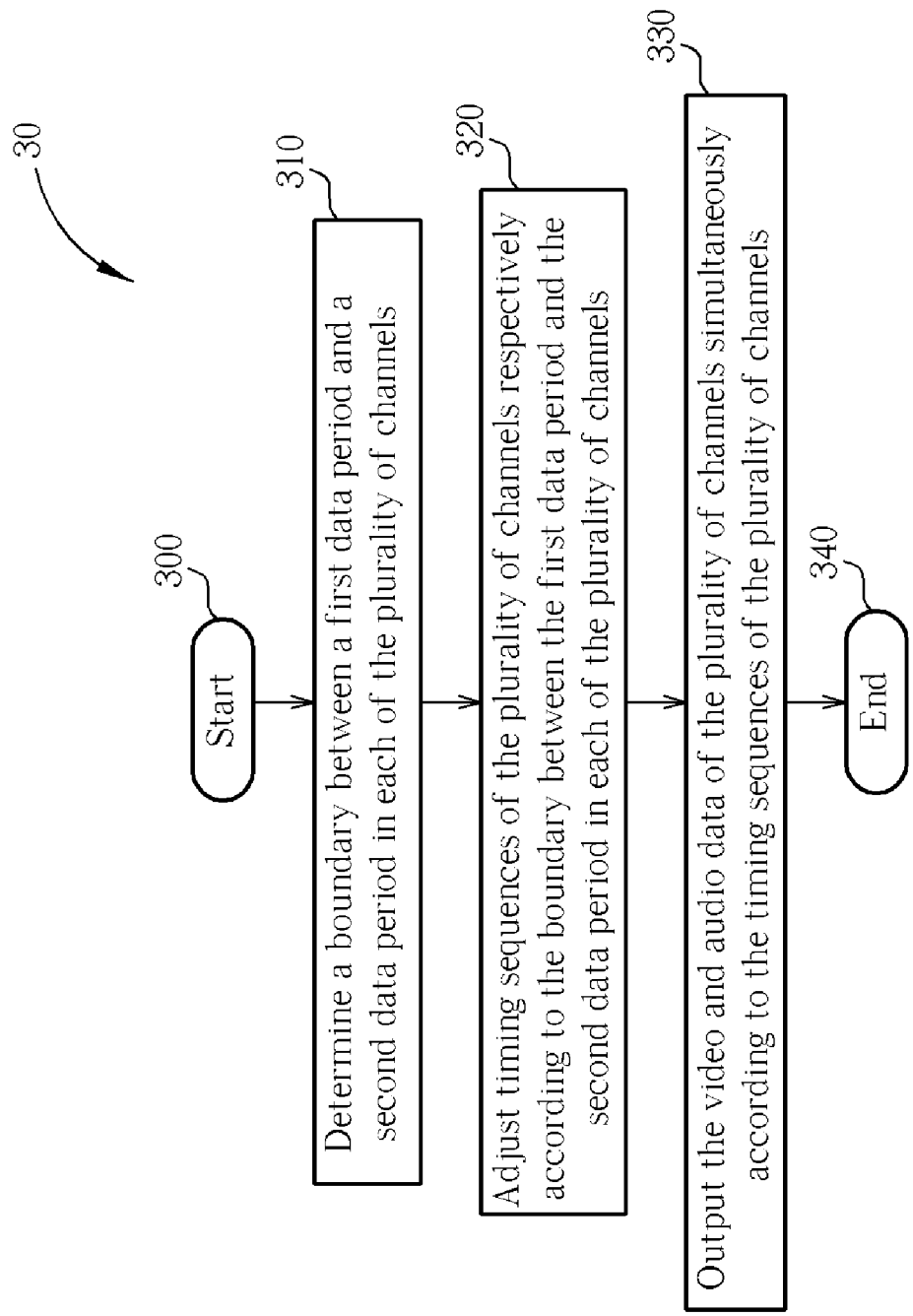
FIG. 3 is a schematic diagram of a video and audio data synchronization process for HDMI according to the present invention.

Please refer to FIG. 3. FIG. 3 is a schematic diagram of a video and audio data synchronization process 30 for a high density multimedia interface (HDMI) according to the present invention. The process 30 is utilized for synchronizing a timing sequence of HDMI data channels, and comprises the following steps:

Step 300: Start.

Step 310: Determine a boundary between a first data period and a second data period in each of the plurality of channels.

Step 320: Adjust timing sequences of the plurality of channels respectively according to the boundary between the first data period and the second data period in each of the plurality of channels.

Step 330: Output the video and audio data of the plurality of channels simultaneously according to the timing sequences of the plurality of channels.

Step 340: End.

According to the process 30, when a receiver receives serial video and audio data transmitted by the plurality of HDMI data channels, the present invention determines a boundary between a first data period and a second data period in each of the plurality of channels, adjusts timing sequences of the plurality of channels respectively according to the boundary between the first data period and the second data period in each of the plurality of channels, and outputs the video and audio data of the plurality of channels simultaneously.

As shown in FIG. 2, the HDMI interface includes the three data transmission channels (TMDS channel 0 through TMDS channel 2) for transmitting serial video and audio data encoded by TMDS. The serial video and audio data transmitted in the TMDS channels can be divided into three kinds of data periods: a packet data period, a video data period, and a control period. Note that the packet data period and the video data period are the data periods including video and audio information. In the present invention, the first data period corresponds to the control period, and the second data period corresponds to the packet data period or the video data period. After determining the boundary between the control period and the data/video period in each channel, the timing sequences of the other two channels are adjusted respectively according to the boundary between the control period and the data/video period in a fist data channel (Step 320). In the present invention, the first data channel can preferably be the TMDS channel 0. Finally, according to the timing sequence of the three data channels, an output device can output the serial video and audio data of the three data channels simultaneously, so that the video and audio data in the plurality of channels can be synchronized for decoding by a decoder (Step 330). Please note that the boundary between the control period and the data/video period in each channel can be determined according to a data pattern difference between the control period and the data/video period.

Figure 4:
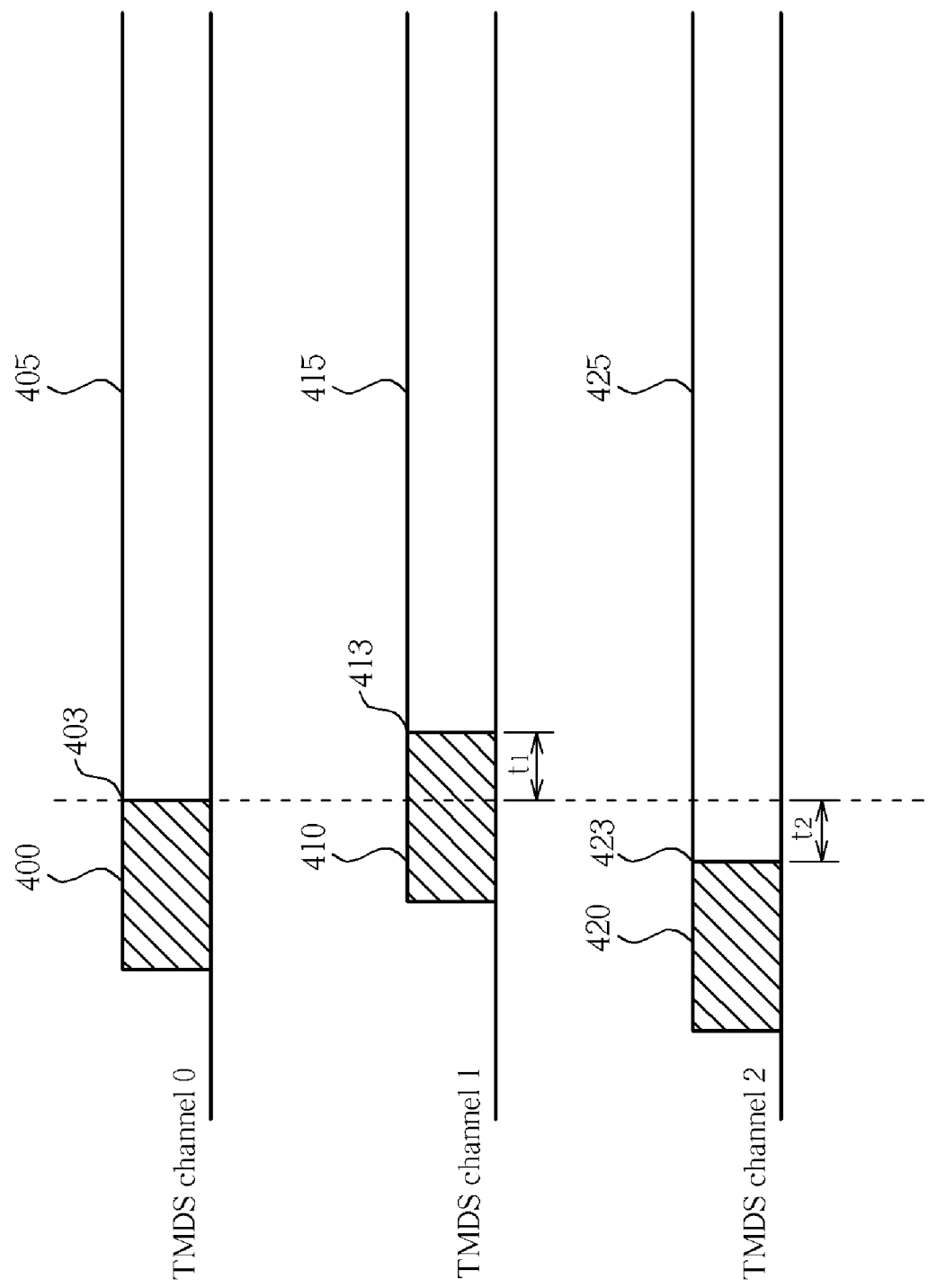
FIG. 4 is a schematic diagram of an embodiment of the process according to the present invention.

For example, please refer to FIG. 4. FIG. 4 is a schematic diagram of an embodiment of the process 30. As shown in FIG. 4, since the length and the impedance of each channel are different, the data transmitted in each channel is delayed by different amounts. Blocks 400, 410, and 420 are the control periods of TMDS channel 0 through TMDS channel 2, respectively; and blocks 405, 415, and 425 are the data/video periods of TMDS channel 0 through TMDS channel 2, respectively. When an HDMI receiver receives serial video and audio data transmitted by TMDS channel 0 through TMDS channel 2, the present invention determines the boundaries 403, 413, and 423 between the control period and the data/video period in each channel first. Then, based on the boundary 403 between the control period and the data/video period in TMDS channel 0, the timing sequences of the other two data channels are adjusted respectively, that is, the timing sequence of TMDS channel 1 is adjusted forward by a period t1 and the timing sequence of TMDS channel 2 is adjusted back by a period t2. Finally, the serial video and audio data of the three data channels can be outputted simultaneously, so that the video and audio data in the channels is synchronized for decoding by a decoder.

Figure 5:
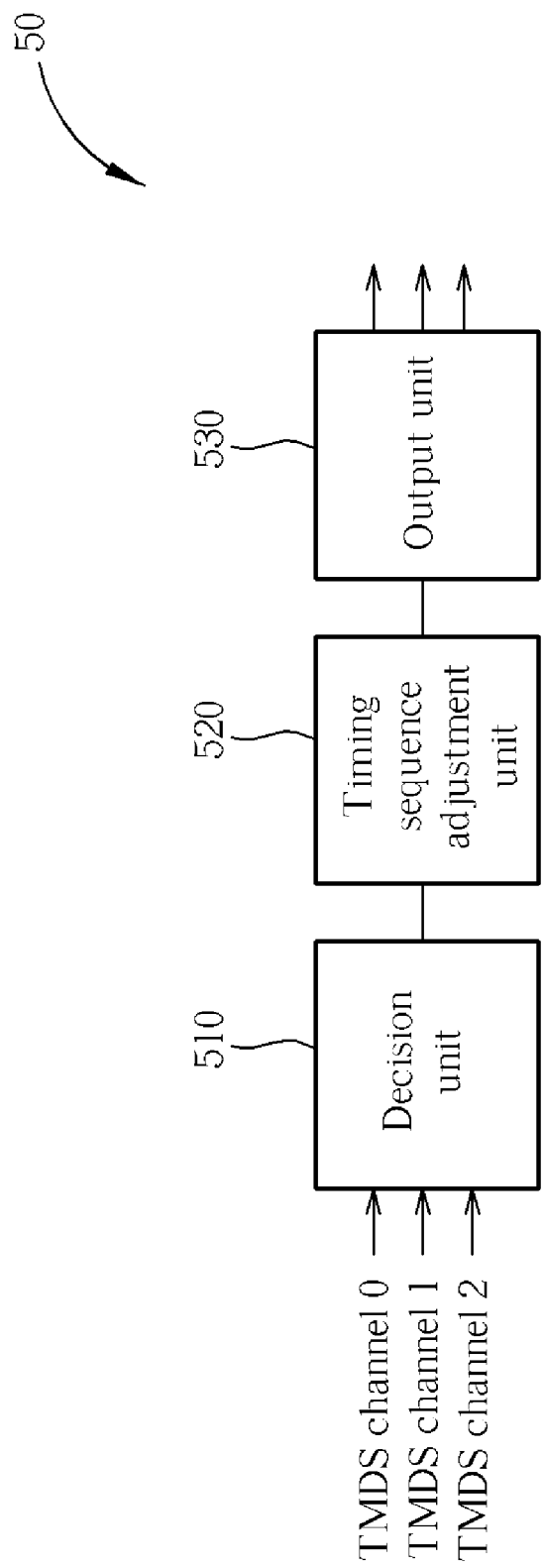
FIG. 5 is a function block diagram of a video and audio data synchronization apparatus for HDMI according to the present invention.

Please refer to FIG. 5. FIG. 5 is a function block diagram of a video and audio data synchronization apparatus 50 for HDMI according to the present invention. The video and audio data synchronization apparatus 50 is utilized for realizing the process 30, and comprises a decision unit 510, a timing sequence adjustment unit 520, and an output unit 530. The decision unit 510 can determine the boundary between the control period and the data/video period in each of the TMDS channels according to specific data patterns of the control period. The timing sequence adjustment unit 520 can adjust the timing sequences of the other two data channels (TMDS channel 1 and TMDS channel 2) respectively based on the boundary between the control period and the data/video period in TMDS channel 0 according to a decision result of the decision unit 510. Finally, the output unit 530 can output the serial video and audio data of TMDS channel 0 through TMDS channel 2 simultaneously for decoding by a decoder according to the adjusted timing sequence of each channel. In another embodiment, the timing sequence adjustment unit 520 further includes a buffer (not shown in FIG. 5) for temporarily storing the video and audio data of the plurality of channels.

As mentioned above, the present invention provides a video and audio synchronization method and related apparatus for HDMI. The present invention utilizes the boundary between the control period and the data/video period of the serial video and audio data in each TMDS channel for calibrating and synchronizing the timing sequences of data transmission in the plurality of channels, so that the decoder of the display devices can correctly return the desired video and audio data from the plurality of video and audio data transmission channels. Furthermore, convenience in circuit design can also be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video and audio data synchronization method for a multimedia interface coupled to a receiver and having a plurality of channels for outputting video and audio data to the receiver comprising:
    determining a boundary between a first data period and a second data period in each of the plurality of channels;
    adjusting timing sequences of the plurality of channels respectively according to the boundary between the first data period and the second data period in each of the plurality of channels; and
    outputting the video and audio data of the plurality of channels simultaneously according to the timing sequences of the plurality of channels.

2. The video and audio data synchronization method of claim 1, wherein the first data period is a control period.

3. The video and audio data synchronization method of claim 1, wherein the second data period is a data/video period.

4. The video and audio data synchronization method of claim 1, wherein determining the boundary between the first data period and the second data period in each of the plurality of channels is determining the boundary between the first data period and the second data period in each of the plurality of channels according to a data format of the first data period in each of the plurality of channels.

5. The video and audio data synchronization method of claim 1, wherein adjusting the timing sequences of the plurality of channels respectively according to the boundary between the first data period and the second data period in each of the plurality of channels is adjusting the timing sequences of the other channels of the plurality of channels according to the boundary between the first data period and the second data period in a first channel of the plurality of channels.

6. The video and audio data synchronization method of claim 1, wherein the multimedia interface is a high-definition multimedia interface (HDMI).

7. The video and audio data synchronization method of claim 1, wherein the plurality of channels transmit serial video and audio data by transition minimized differential signaling (TMDS).

8. A video and audio data synchronization apparatus for a multimedia interface coupled to a receiver and having a plurality of channels for outputting video and audio data to the receiver comprising:
    a decision unit comprising a processor for executing a program code and a memory storing the program code, wherein the program code comprises determining a boundary between a first data period and a second data period in each of the plurality of channels;
    a timing sequence adjustment unit coupled to the decision unit for adjusting timing sequences of the plurality of channels respectively according to the boundary between the first data period and the second data period in each of the plurality of channels; and
    an output unit coupled to the timing sequence adjustment unit for outputting the video and audio data of the plurality of channels simultaneously according to the timing sequences of the plurality of channels.

9. The video and audio data synchronization apparatus of claim 8, wherein the first data period is a control period.

10. The video and audio data synchronization apparatus of claim 8, wherein the second data period is a data/video period.

11. The video and audio data synchronization apparatus of claim 8, wherein the decision unit is utilized for determining the boundary between the first data period and the second data period in each of the plurality of channels according to a data format of the first data period in each of the plurality of channels.

12. The video and audio data synchronization apparatus of claim 8, wherein the timing sequence adjustment unit is utilized for adjusting the timing sequences of the other channels of the plurality of channels according to the boundary between the first data period and the second data period in a first channel of the plurality of channels.

13. The video and audio data synchronization apparatus of claim 8, wherein the timing sequence adjustment unit comprises a buffer for registering the video and audio data of the plurality of channels.

14. The video and audio data synchronization apparatus of claim 8, wherein the multimedia interface is a high-definition multimedia interface (HDMI).

15. The video and audio data synchronization apparatus of claim 8, wherein the plurality of channels transmit serial video and audio data by transition minimized differential signaling (TMDS).

* * * * *